United States Patent
Qin et al.

(10) Patent No.: US 11,100,180 B2
(45) Date of Patent: Aug. 24, 2021

(54) INTERACTION METHOD AND INTERACTION DEVICE FOR SEARCH RESULT

(71) Applicant: BAIDU ONLINE NETWORK TECHNOLOGY (BEIJING) CO., LTD., Beijing (CN)

(72) Inventors: Shouke Qin, Beijing (CN); Xiaochun Liu, Beijing (CN); Zeming Zhang, Beijing (CN); You Han, Beijing (CN); Xiaoyue Liu, Beijing (CN); Mi Cao, Beijing (CN); Xiaohua Cheng, Beijing (CN); Shanyu Wang, Beijing (CN); Peizhi Xu, Beijing (CN); Yan Jiang, Beijing (CN); Zhen Chen, Beijing (CN); Xuezhong Qiu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 343 days.

(21) Appl. No.: 16/322,102

(22) PCT Filed: Nov. 18, 2016

(86) PCT No.: PCT/CN2016/106442
§ 371 (c)(1),
(2) Date: Jan. 30, 2019

(87) PCT Pub. No.: WO2018/018801
PCT Pub. Date: Feb. 1, 2018

(65) Prior Publication Data
US 2019/0188231 A1 Jun. 20, 2019

(30) Foreign Application Priority Data

Jul. 25, 2016 (CN) .......................... 201610591921.9

(51) Int. Cl.
*G06F 17/30* (2006.01)
*G06F 16/9535* (2019.01)
(Continued)

(52) U.S. Cl.
CPC .......... *G06F 16/9535* (2019.01); *G06F 3/167* (2013.01); *G06F 16/00* (2019.01);
(Continued)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,316,037 B1 * 11/2012 Garg .................. G06F 16/9535
707/758
8,751,502 B2 * 6/2014 Agrawal ............... G06F 16/489
707/739
(Continued)

FOREIGN PATENT DOCUMENTS

| CN | 1632832 A | 6/2005 |
| CN | 101819663 A | 9/2010 |

(Continued)

OTHER PUBLICATIONS

Japanese Patent Application No. 2018554057 second Office Action dated Jun. 30, 2020, 4 pages.
(Continued)

*Primary Examiner* — Hung D Le
(74) *Attorney, Agent, or Firm* — Lathrop GPM LLP

(57) ABSTRACT

The present disclosure provides an interaction method and an interaction device for a search result. The method includes: in response to determining that an interaction operation is performed, by a user of an electronic device, on the search result through a browser, extracting an interaction
(Continued)

instruction based on the interaction operation; generating a guiding interaction step matching with the interaction instruction based on a preset rule; and prompting the user based on the guiding interaction step, such that the user performs interaction with the search result based on the guiding interaction step.

9 Claims, 9 Drawing Sheets

(51) Int. Cl.
*G06F 3/16* (2006.01)
*G06F 16/00* (2019.01)
*G06F 16/538* (2019.01)
*G06F 16/9538* (2019.01)
*G10L 15/22* (2006.01)

(52) U.S. Cl.
CPC ........ *G06F 16/538* (2019.01); *G06F 16/9538* (2019.01); *G10L 15/22* (2013.01); *G10L 2015/223* (2013.01)

(56) References Cited

U.S. PATENT DOCUMENTS

| | | | | |
|---|---|---|---|---|
| 2007/0124298 A1* | 5/2007 | Agrawal | ............. | G06F 16/7844 |
| 2010/0082661 A1* | 4/2010 | Beaudreau | .......... | G06F 16/9535 707/769 |
| 2013/0238612 A1* | 9/2013 | Tsongas | .............. | G06F 16/9535 707/723 |
| 2013/0325840 A1* | 12/2013 | Kritt | ................... | G06F 16/9535 707/709 |
| 2014/0244634 A1* | 8/2014 | Duleba | ................. | G06F 16/951 707/724 |
| 2015/0006502 A1* | 1/2015 | Chang | ............... | G06F 16/24564 707/708 |
| 2015/0220647 A1* | 8/2015 | Gangwani | ............. | G06F 16/951 707/731 |

FOREIGN PATENT DOCUMENTS

| | | |
|---|---|---|
| CN | 202870858 U | 4/2013 |
| CN | 104063521 A | 9/2014 |
| CN | 104090923 A | 10/2014 |
| CN | 105512931 A | 4/2016 |
| CN | 105575198 A | 5/2016 |
| JP | 2009508274 A | 2/2009 |
| JP | 2013505503 A | 2/2013 |
| JP | 2014522005 A | 8/2014 |
| JP | 2016123001 A | 7/2016 |
| WO | WO 2012039054 A1 | 3/2012 |
| WO | WO-2013188603 A2 * | 12/2013 ........... G06F 16/951 |

OTHER PUBLICATIONS

Japanese Patent Application No. 2018554057 English translation of second Office Action dated Jun. 30, 2020, 4 pages.
Yamada, Y. "Image Base Virtual Fitting System by Deformation of Garment Images in consideration of Form" Information Processing Society of Japan Report of Research Graphics and CAD, Feb. 13, 2014, pp. 1-8.
Japanese Patent Application No. 2018-554057 Office Action dated Oct. 23, 2019, 4 pages.
Japanese Patent Application No. 2018-554057 English translation of Office Action dated Oct. 23, 2019, 3 pages.
Ogawa, The Role of IT in Marketing Automation for Hospitality, Japan, Cross Media Marketing, Inc., Feb. 1, 2015, First Edition, 34-37.
Ogawa, English translation of the Role of IT in Marketing Automation for Hospitality, Japan, Cross Media Marketing, Inc., Feb. 1, 2015, First Edition, 34-37 (3 pages).
Yamada, et al., Image-based virtual try-on system based on deformation of clothes image considering body shape, Japanese Institute of Information Processing Research Report Graphics and CAD (CG) 2014-CG-154 [Online], Japan, Japan Information Processing Society, Feb. 13, 2014, pp. 1-8.
PCTCN2016106442 English translation of International Search Report dated Mar. 29, 2017, 11 pages.
PCTCN2016106442 International Search Report and Written Opinion dated Mar. 29, 2017, 2 pages.
Chinese Patent Application No. 201610591921.9 Office Action dated Dec. 29, 2018, 10 pages.
Chinese Patent Application No. 201610591921.9 English translation of Office Action dated Dec. 29, 2018, 15 pages.
Chinese Patent Application No. 201610591921.9 Office Action dated Mar. 2, 2020, 10 pages.
Chinese Patent Application No. 201610591921.9 English translation of Office Action dated Mar. 2, 2020, 13 pages.

* cited by examiner

# INTERACTION METHOD AND INTERACTION DEVICE FOR SEARCH RESULT

CROSS REFERENCE TO RELATED APPLICATION

This application is a US national phase application based upon International Application No. PCT/CN2016/106442, filed on Nov. 18, 2016, which is based on and claims priority to Chinese Patent Application No. 201610591921.9, filed on Jul. 25, 2016, the entire contents of which are incorporated herein by reference.

FIELD

The present disclosure relates to a field of search engine technology, and more particularly to an interaction method and an interaction device for a search result.

BACKGROUND

When a user searches for related information using a browser in an electronic device, there is a desire to implement an immersive and scene-based experience through a search result webpage. For example, the user hopes to achieve diversity interaction with search results by multiple types of interaction ways such as browsing, listening, touching, sliding, scaling, stating, photographing, and the like.

SUMMARY

In a first aspect, embodiments of the present disclosure provide an interaction method for a search result. The search result is a rich media search result. The method includes:

in response to determining that an interaction operation is performed, by a user of an electronic device, on the search result through a browser, extracting an interaction instruction based on the interaction operation;

generating a guiding interaction step matching with the interaction instruction based on a preset rule; and prompting the user based on the guiding interaction step, such that the user performs interaction with the search result based on the guiding interaction step.

In a second aspect, embodiments of the present disclosure provide an interaction method for a search result. The search result is a rich media search result. The method includes:

in response to determining that an interaction operation is performed, by a user of an electronic device, on the search result through a browser, extracting an interaction instruction based on the interaction operation;

reading association data of the search result matching the interaction instruction, and displaying the association data to the user.

In a third aspect, embodiments of the present disclosure provide an interaction device for a search result. The search result is a rich media search result. The device includes:

a first extracting module, configured to, in response to determining that an interaction operation is performed, by a user of an electronic device, on the search result through a browse, extract an interaction instruction based on interaction operation;

a generation module, configured to generate a guiding interaction step matching with the interaction instruction based on a preset rule; and a prompting module, configured to promote the user based on the guiding interaction step, such that the user performs interaction with the search result based on the guiding interaction step.

In a fourth aspect, embodiments of the present disclosure provide an interaction device for a search result. The search result is a rich media search result. The device includes:

a second extraction module, configured to, in response to determining that an interaction operation is performed, by a user of an electronic device, on the search result through a browser, extract an interaction instruction based on interaction operation;

a reading module, configured to read association data of the search result matching the interaction instruction, and display the association data to the user.

BRIEF DESCRIPTION OF THE DRAWINGS

In order to more clearly illustrate embodiments of the present disclosure or technical solutions in the related art, embodiments or accompanying drawings needed to use in the related technical description will be introduced clearly below. Apparently, the accompanying drawings described below are only a part of embodiments of the present disclosure. For the ordinary skilled in the art, other drawings may further be obtained based on these accompanying drawings without creative work.

DETAILED DESCRIPTION

Description will be made in detail below to embodiments of the present disclosure with reference to the accompanying drawings.

It should be clear that, embodiments described are only a part of and not all of embodiments of the present disclosure. All other embodiments obtained based on embodiments disclosed in the present disclosure by the ordinary skilled in the art without creative work should fall within the protection scope of the present disclosure.

Figure 1:
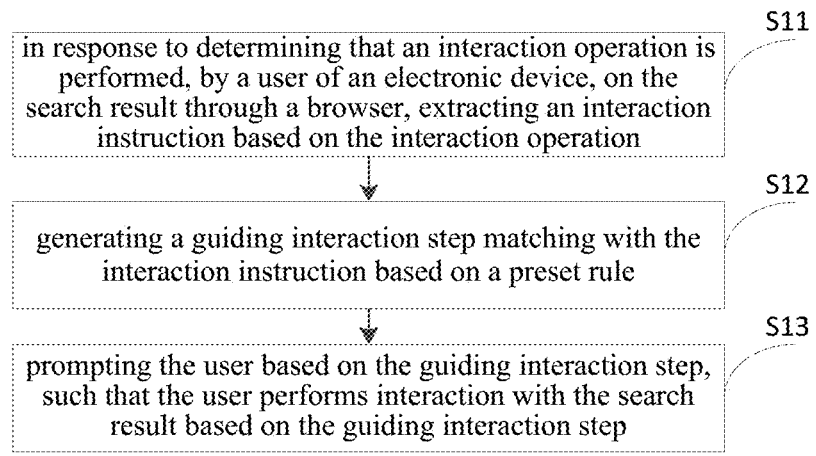
FIG. 1 is a flow chart illustrating an interaction method for a search result provided in an embodiment of the present disclosure.

FIG. 1 is a flow chart illustrating an interaction method for a search result provided in an embodiment of the present disclosure. The embodiment takes that the interaction method for the search result is configured in an interaction device for the search result as an example to illustrate. The interaction method for the search result may be applicable to a search engine in a browser of an electronic device.

In some embodiments of the present disclosure, the search result is a rich media search result.

The electronic device may include a Personal Computer (PC), a cloud device or a mobile device. The mobile device may include a smart phone, or a tablet computer.

As illustrated in FIG. 1, the interaction method for the search result includes actions in following blocks.

At block S11, in response to determining that an interaction operation is performed, by a user of the electronic device, on the search result through the browser, an interaction instruction is extracted based on the interaction operation.

Alternatively, the user may input a query at a search box of the search engine (such as, Baidu search engine).

For example, the user may input the query at the search box of the search engine in the electronic device, to obtain a rich media search result corresponding to the query.

In some embodiments of the present disclosure, the user may perform diversity interaction with the rich media search result.

Figure 2:
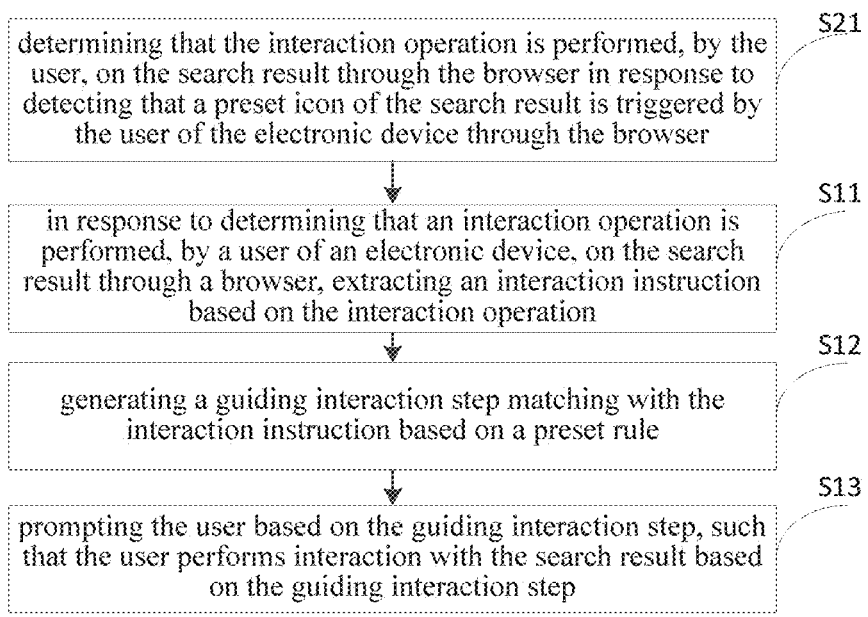
FIG. 2 is a flow chart illustrating an interaction method for a search result provided in another embodiment of the present disclosure.

In some embodiments of the present disclosure, as illustrated in FIG. 2, determining that the interaction operation is performed, by the user of the electronic device, on the search result through the browser may include following actions.

At block S21, determining that the interaction operation is performed, by the user, on the search result through the browser in response to detecting that a preset icon of the search result is triggered by the user of the electronic device through the browser.

In embodiments of the present disclosure, the preset icon includes a first icon configured to start a camera of the electronic device, and the interaction method for the search result further includes: when the interaction instruction includes an instruction triggering the first icon, collecting image data of the user through the camera, and displaying the image data in a search result webpage. For example, the user may input the query at the search box of the search engine in the electronic device, to obtain the rich media search result corresponding to the query. It is determined that the interaction operation is performed, by the user, on the search result through the browser in response to detecting that the user of the electronic device triggers the first icon of the search result through the browser, in which, the first icon is configured to start the camera of the electronic device. Then, the image data of the user is collected through the camera, and the image data is displayed in the search result webpage. At this time, it is determined that the interaction operation is performed, by the user, on the search result through the browser, the image data of the user is collected by the camera, and the image data is displayed in the search result webpage, thus enabling the user to interact with the rich media search result based on the image data, and improving the user's experience.

Figures 3, 4:
FIG. 3 is a schematic diagram illustrating a search result webpage according to embodiments of the present disclosure.
FIG. 4 is a schematic diagram illustrating configuring a model in a search result webpage according to embodiments of the present disclosure.

As an example, as illustrated in FIG. 3, FIG. 3 is a schematic diagram illustrating a search result webpage provided in embodiments of the present disclosure, in which, FIG. 3 illustrates a search box 31, a search result 32, a camera 33, a microphone 34 and a model display area 35. When the user inputs a query "fashion women clothes" at the search box 31, the search result 32 of "fashion women clothes" is displayed on the left side of the search result webpage accordingly. When the user triggers the first icon configured to start the camera 33 of the electronic device, image data of the user is collected by the camera 33, and the image data is displayed on a live model in the model display area 35 of the search result webpage. For example, as illustrated in FIG. 4, when the image data of the user is collected through the camera 41, the data image of the user is displayed in the model display area 42 on the right of the search result webpage accordingly. The user may perform the interaction operation with the rich media search result based on the image data. For example, the fashion women clothes in the search result 32 are tried on based on the image data, which is not limited herein.

In embodiments of the present disclosure, the preset icon includes: a second icon configured to start a microphone of the electronic device, and the interaction method for the search result further includes: collecting speech data of the user through the microphone when the interaction instruction includes an instruction triggering the second icon.

For example, the user may input the query at the search box of the search engine in the electronic device, to obtain the search result corresponding to the query. It is determined that the interaction operation is performed, by the user, on the search result through the browser in response to detecting that the user of the electronic device triggers the second icon of the search result through the browser, in which, the second icon is configured to start the microphone of the electronic device. Then, the speech data of the user is collected through the microphone. At this time, it is determined that the interaction operation is performed, by the user, on the search result through the browser. The speech data of the user is collected through the microphone, which may enable the user to interact with the rich media search result based on the speech data, and improve the user's experience.

As an example, as illustrated in FIG. 3, when the user starts the second icon of the microphone 34 of the electronic device, the microphone 34 collects the speech data of the user, and the interaction is triggered, such that the live model in the model display area 35 of the search result webpage is configured based on the speech data of the user. The user may perform the interaction operation with the rich media search result based on the speech data. For example, the live model in the model display area 35 is configured based on the speech data, which is not limited herein.

Alternatively, an instruction triggering the first icon are extracted in response to detecting that the user of the electronic device triggers the first icon of the search result through the browser, in which, the first icon is configured to start the camera of the electronic device. An instruction triggering the second icon are extracted in response to detecting that the user of the electronic device triggers the second icon of the search result through the browser, in which the second icon is configured to start the microphone of the electronic device.

At block S12, a guiding interaction step matching with the interaction instruction is generated based on a preset rule.

In embodiments of the present disclosure, the preset rule may be pre-configured in a database of the electronic device, and may also be configured in a server, which is not limited herein.

For example, when the interaction instruction includes the instruction triggering the first icon configured to start the camera of the electronic device, the guiding interaction step matching with the instruction triggering the first icon which is configured to start the camera of the electronic device is generated based on the preset rule, so as to prompt the user.

Alternatively, when the interaction instruction includes an instruction triggering the second icon configured to start the microphone of the electronic device, the guiding interaction step matching with the instruction triggering the second icon which is configured to start the microphone of the electronic device is generated based on the preset rule, so as to prompt the user.

At block S13, the user is prompted based on the guiding interaction step, such that the user performs interaction with the search result based on the guiding interaction step.

Alternatively, the user is prompted based on the guiding interaction step, such that the user performs interaction with the search result based on the guiding interaction step.

As an example, as illustrated in FIG. 3, the guiding interaction step matching with the instruction triggering the first icon which is configured to start the camera 33 of the electronic device is generated based on the preset rule, and the user is prompted based on the guiding operation step, such that the user configures the live model in the model display area 35 based on the guiding interaction step. For example, when the user collects the image data of the user through the camera 33, the user may click an image in the search result 32 of "fashion women clothes" on the left of the search result webpage, and drag the image onto the live model, such that the fashion women clothes in the search result 32 is tried on based on the image data, improving the immersive and scene-based experience of the user.

As an example, as illustrated in FIG. 3, the guiding interaction step matching with the instruction triggering the second icon which is configured to start the microphone 34 of the electronic device is generated based on the preset rule, and the user is prompted based on the guiding operation step, such that the user configures a 3D (three dimensional) model in the model display area 35 based on the guiding interaction step. For example, when it is not convenient for the user to collect his/her own image data, the user may input a piece of speech data to describe his/her own body type through the microphone 34, such that the user configures the live model in the search result 35 based on the speech data, achieving clothes trying on and clothes changing. Alternatively, the user may input the speech data through the microphone 34, and a speech search function is provided to the user, such that the user may search for his/her needed clothes intelligently, achieving clothes trying on and clothes changing fast and conveniently, which is not limited herein.

In some embodiments, the user is prompted based on the guiding interaction step, such that the user is enable to interact with the rich media search result based on the guiding interaction step, thus achieving diversity interaction between the user and the rich media search result, and effectively improving the immersive and scene-based experience of the user.

Figure 5:
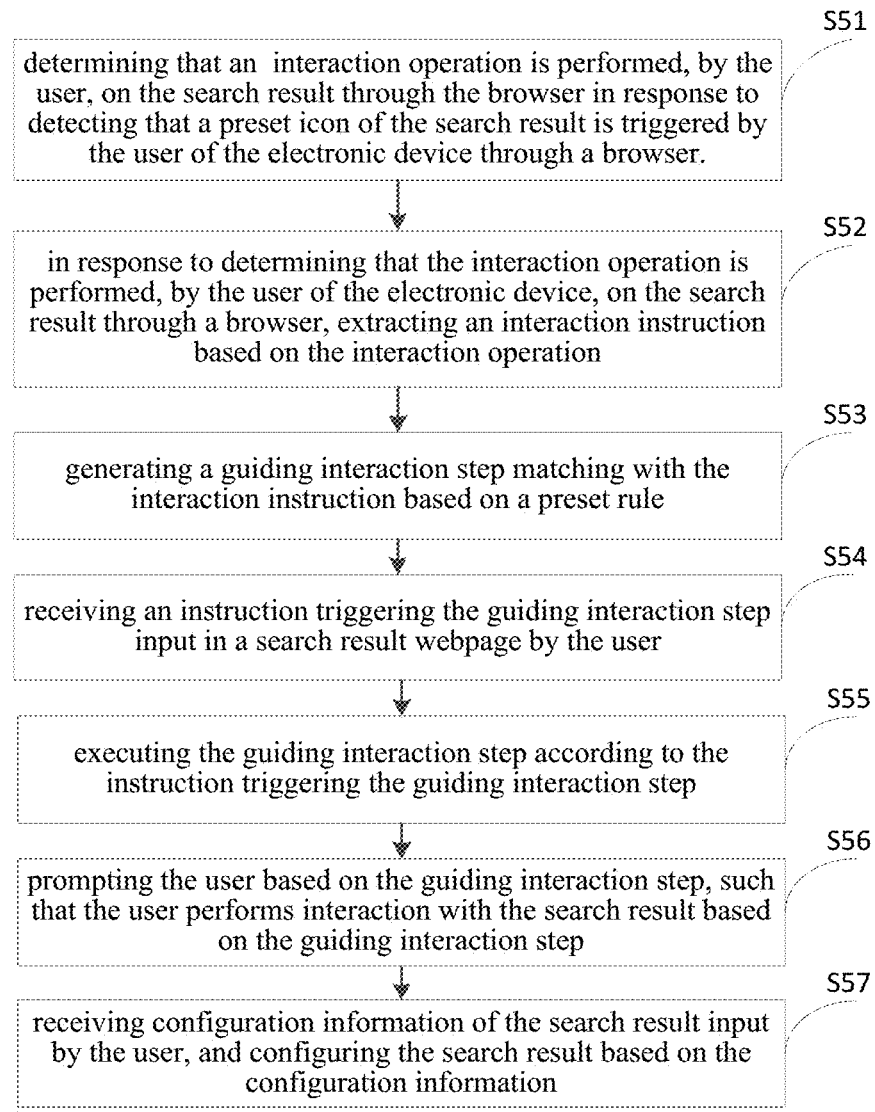
FIG. 5 is a flow chart illustrating an interaction method for a search result provided in another embodiment of the present disclosure.

FIG. 5 is a flow chart illustrating an interaction method for a search result provided in another embodiment of the present disclosure. The embodiment takes that the interaction method for the search result is configured in an interaction device for the search result as an example to illustrate.

As illustrated in FIG. 5, the interaction method for the search result includes actions at following blocks.

At block S51, it is determined that an interaction operation is performed, by the user, on the search result through a browser in response to detecting that a preset icon of a search result is triggered by the user of the electronic device through a browser.

Alternatively, the user may input a query at the search box of the search engine (such as, Baidu search engine).

For example, the user may input the query at the search box of the search engine in the electronic device, and obtain a rich media search result corresponding to the query. It is determined that the interaction operation is performed on the search result by the user through the browser in response to detecting that the first icon of the search result is triggered by the user of the electronic device through the browser, in which, the first icon is configured to start the camera of the electronic device. Then, the image data of the user is collected through the camera, and the image data is displayed in the search result webpage. At this time, it is determined that the interaction operation is performed, by the user, on the search result through the browser, the image data of the user is collected by the camera, and the image data is displayed in the search result webpage, which may enable the user to interact with the rich media search result based on the image data, and improve the user's experience.

As an example, as illustrated in FIG. 3, FIG. 3 is a schematic diagram illustrating a search result webpage provided in embodiments of the present disclosure, in which, FIG. 3 illustrates a search box 31, a search result 32, a camera 33, a microphone 34 and a model display area 35. When the user inputs a query "fashion women clothes" at the search box 31, the search result 32 of "fashion women clothes" is displayed on the left side of the search result webpage accordingly. When the user triggers the first icon configured to start the camera 33 of the electronic device, image data of the user is collected by the camera 33, and the image data is displayed on a live model in the model display area 35 of the search result webpage. For example, as illustrated in FIG. 4, when the image data of the user is collected through the camera 41, the data image of the user is displayed in the model display area 42 on the right of the search result webpage accordingly. The user may perform the interaction operation with the rich media search result based on the image data. For example, the fashion women clothes in the search result 32 are tried on based on the image data, which is not limited herein.

Alternatively, the user may input the query at the search box of the search engine in the electronic device, and obtain the search result corresponding to the query. It is determined that the interaction operation is performed, by the user, on the search result through the browser in response to detecting that the second icon of the search result is triggered by the user of the electronic device through the browser, in which, the second icon is configured to start the microphone of the electronic device. Then, the speech data of the user is collected through the microphone. At this time, it is determined that the interaction operation is performed, by the user, on the search result through the browser. The speech data of the user is collected through the microphone, which may enable the user to interact with the rich media search result based on the speech data, and improve the user's experience.

As an example, as illustrated in FIG. 3, when the user starts the second icon of the microphone 34 of the electronic device, the microphone 34 collects the speech data of the user, such that the live model in the model display area 35 of the search result webpage is configured based on the speech data of the user. The user may perform the interaction operation with the rich media search result based on the speech data. For example, the live model in the model display area 35 is configured based on the speech data, which is not limited herein.

At block S52, in response to determining that the interaction operation is performed, by the user of the electronic device, on the search result through the browser, the interaction instruction is extracted based on the interaction operation.

Alternatively, an instruction triggering the first icon are extracted in response to detecting that the user of the electronic device triggers the first icon of the search result through the browser, in which, the first icon is configured to start the camera of the electronic device. An instruction triggering the second icon are extracted in response to detecting that the user of the electronic device triggers the second icon of the search result through the browser, in which the second icon is configured to start the microphone of the electronic device.

At block S53, the guiding interaction step matching with the interaction instruction is generated based on a preset rule.

In embodiments of the present disclosure, the preset rule may be pre-configured in a database of the electronic device, and may also be configured in a server, which is not limited herein.

For example, when the interaction instruction includes the instruction triggering the first icon configured to start the camera of the electronic device, the guiding interaction step matching with the instruction triggering the first icon which is configured to start the camera of the electronic device is generated based on the preset rule, so as to prompt the user.

Alternatively, when the interaction instruction includes an instruction triggering the second icon configured to start the microphone of the electronic device, the guiding interaction step matching with the instruction triggering the second icon which is configured to start the microphone of the electronic device is generated based on the preset rule, so as to prompt the user.

At block S54, an instruction triggering the guiding interaction step input in a search result webpage by the user is received.

Alternatively, the browser receives the instruction triggering the guiding interaction step input in the search result webpage by the user, so as to execute the guiding interaction step according to the instruction triggering the guiding interaction step.

At block S55, the guiding interaction step is executed based on the instruction triggering the guiding interaction step.

Alternatively, the guiding interaction step is executed based on the instruction triggering the guiding interaction step, such that the user performs interaction with the rich media search result based on the guiding interaction step.

At block S56, the user is prompted based on the guiding interaction step, such that the user performs interaction with the search result based on the guiding interaction step.

Alternatively, the user is prompted based on the guiding interaction step, such that the user performs interaction with the search result based on the guiding interaction step.

As an example, as illustrated in FIG. 3, the guiding interaction step matching with the instruction triggering the first icon which is configured to start the camera 33 of the electronic device is generated based on the preset rule, and the user is prompted based on the guiding operation step, such that the user configures the live model in the model display area 35 based on the guiding interaction step. For example, when the user collects the image data of the user through the camera 33, the user may click an image in the search result 32 of "fashion women clothes" on the left of the search result webpage, and drag the image onto the live model, such that the fashion women clothes in the search result 32 is tried on based on the image data, improving the immersive and scene-based experience of the user.

As an example, as illustrated in FIG. 3, the guiding interaction step matching with the instruction triggering the second icon which is configured to start the microphone 34 of the electronic device is generated based on the preset rule, and the user is prompted based on the guiding operation step, such that the user configures a 3D (three dimensional) model in the model display area 35 based on the guiding interaction step. For example, when it is not convenient for the user to collect his/her own image data, the user may input a piece of speech data to describe his/her own body type through the microphone 34, such that the user configures the live model in the search result 35 based on the speech data, achieving clothes trying on and clothes changing. Alternatively, the user may input the speech data through the microphone 34, and a speech search function is provided to the user, such that the user may search for his/her needed clothes intelligently, achieving clothes trying on and clothes changing fast and conveniently, which is not limited herein.

At block S57, configuration information of the search result input by the user is received, and the search result is configured based on the configuration information.

For example, the user may influence or modify the information in the search result webpage in the electronic device through actions such as touching, sliding, and zooming. Alternatively, the user may input a new image or audio information, to modify the information of the search result webpage, which is not limited herein.

In some embodiments, the user is prompted based on the guiding interaction step, so as to enable the user to interact with the rich media search result based on the guiding interaction step, thus achieving diversity interaction between the user and the rich media search result, and effectively improving the immersive and scene-based experience of the user. By receiving the configuration information of the search result input by the user, and configuring the search result based on the configuration information, the user may obtain personalized search information, effectively improving the user experience.

Figure 6:
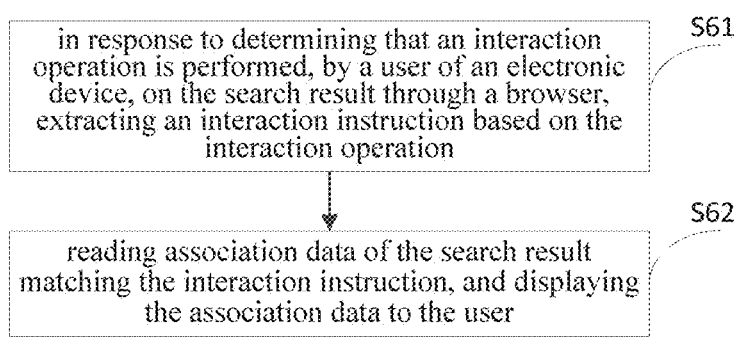
FIG. 6 is a flow chart illustrating an interaction method for a search result provided in another embodiment of the present disclosure.

FIG. 6 is a flow chart illustrating an interaction method for a search result provided in another embodiment of the present disclosure. The embodiment takes that the interaction method for the search result is configured in an interaction device for the search result as an example to illustrate.

As illustrated in FIG. 6, the interaction method for the search result includes actions in following blocks.

At block S61, in response to determining that an interaction operation is performed, by a user of an electronic device, on the search result through a browser, an interaction instruction is extracted based on the interaction operation.

For example, the interaction operation may be locating the search result, moving in the space of the search result, touching, swiping, and zooming the search result, and the like, which is not limited herein.

Figure 7:
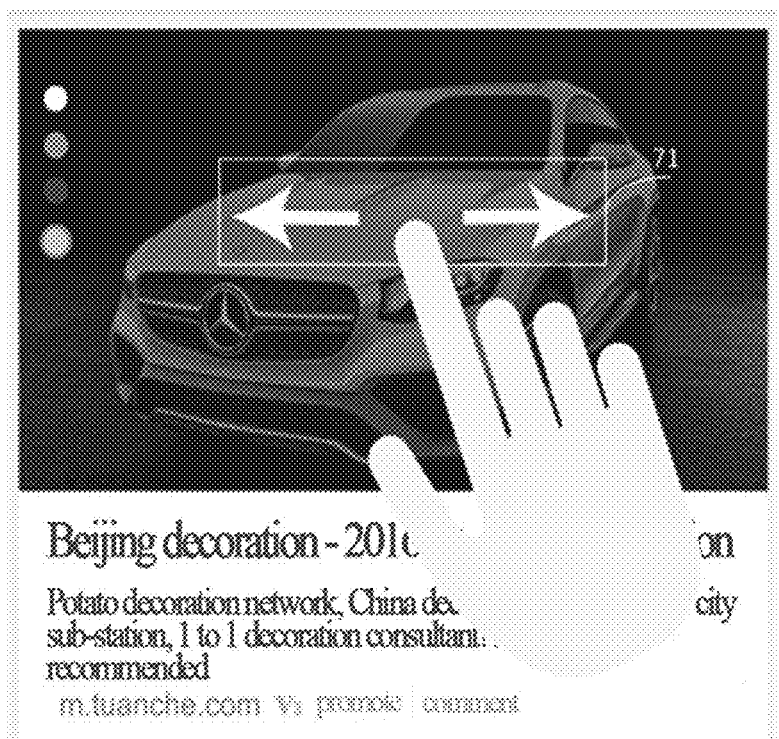
FIG. 7 is a schematic diagram illustrating a user implementing diversity interaction with a search result through a sliding interaction way according to embodiments of the present disclosure.

As an example, as illustrated in FIG. 7, FIG. 7 illustrates a sliding direction icon 71. When the user touches the sliding direction icon 71 in the rich media search result, 360° view of car model may be achieved, obtaining an immersive live experience.

Figure 8:
FIG. 8 is a schematic diagram illustrating a user implementing diversity interaction with a search result through a zooming interaction way according to embodiments of the present disclosure.

As an example, as illustrated in FIG. 8, FIG. 8 illustrates a zooming icon 81. When the user touches the zooming icon 81 in the rich media search result, the user may carefully view the technology (process) and materials that the user cares about and may obtain comprehensive information on a customer product service.

At block S62, association data of the search result matching the interaction instruction is read, and the association data is displayed to the user.

Alternatively, the association data of the search result matching the interaction instruction is read, and the association data is displayed to the user, thus the association data of the search result may be automatically mined from the search engine, enabling the user to obtain the needed information to the maximum extent and improving the user experience.

Figure 9:
FIG. 9 is a schematic diagram illustrating a search result webpage provided in another embodiment of the present disclosure.
Figure 10:
FIG. 10 is a schematic diagram illustrating a user implementing diversity interaction with a search result through a touching interaction way according to embodiments of the present disclosure.
Figure 11:
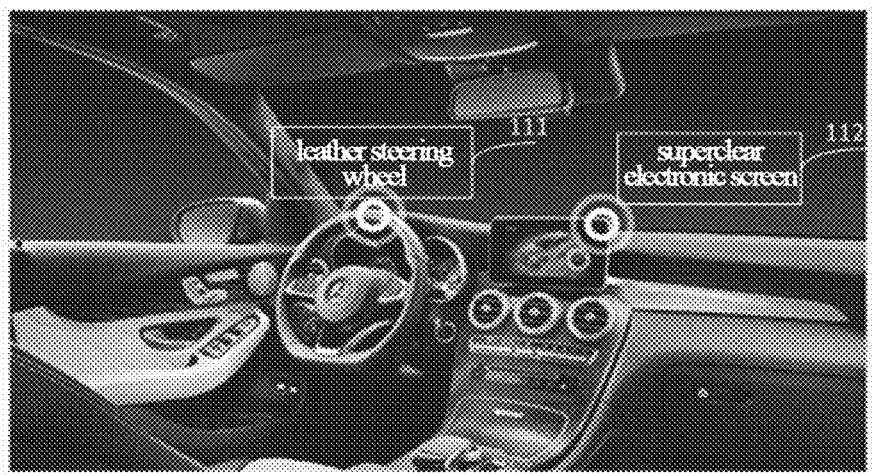
FIG. 11 is a schematic diagram illustrating a scene-based experience according to embodiments of the present disclosure.

As an example, as illustrated in FIG. 9, FIG. 9 illustrates a search box 91 and a search result 92. When the user inputs a query "Mercedes Benz glc" at the search box 91 of the search engine, the search result webpage displays the search result 92 of "Mercedes Benz glc" accordingly, and at this time, only displaying data related to a model of Mercedes Benz glc. As illustrated in FIG. 10, FIG. 10 illustrates lacquer process 101 and interior 102 of Mercedes-Benz glc. When the user clicks the interiors 102 of Mercedes-Benz glc, as illustrated in FIG. 11, a leather steering wheel 111 and a superclear electronic screen 112 are illustrated, the browser displays the data associated such as the leather steering wheel 111, the superclear electronic screen 112 and the like to the user accordingly.

Figure 12:
FIG. 12 is a schematic diagram illustrating a user implementing diversity interaction with a search result through a touching interaction way according to another embodiment of the present disclosure.
Figure 13:
FIG. 13 is a schematic diagram illustrating implementing diversity interaction between a search result and a user through a touching interaction way according to another embodiment of the present disclosure.

As an example, as illustrated in FIG. 12, FIG. 12 illustrates a search box 121, a search result 122, a kitchen direction icon 123, and a bedroom direction icon 124. When the user inputs a query "decoration" at the search box 121 of the search engine, the search result webpage displays the search result 122 of "decoration" accordingly, and at this time, only displaying decoration data related to a living room. When touching the bedroom direction icon 124 in FIG. 12, as illustrated in FIG. 13 illustrating a living direction icon 131, the user may view the decoration data of the bedroom. Certainly, the user may further touch the living direction icon 131 in FIG. 13 to return to the living room illustrated in FIG. 12, which is not limited herein.

In some embodiments, the association data of the search result matching the interaction instruction is displayed to the user, such that diversity interaction between the user and the rich media search result may be implemented, effectively improving the immersive and contextualized experience of the user.

Figure 14:
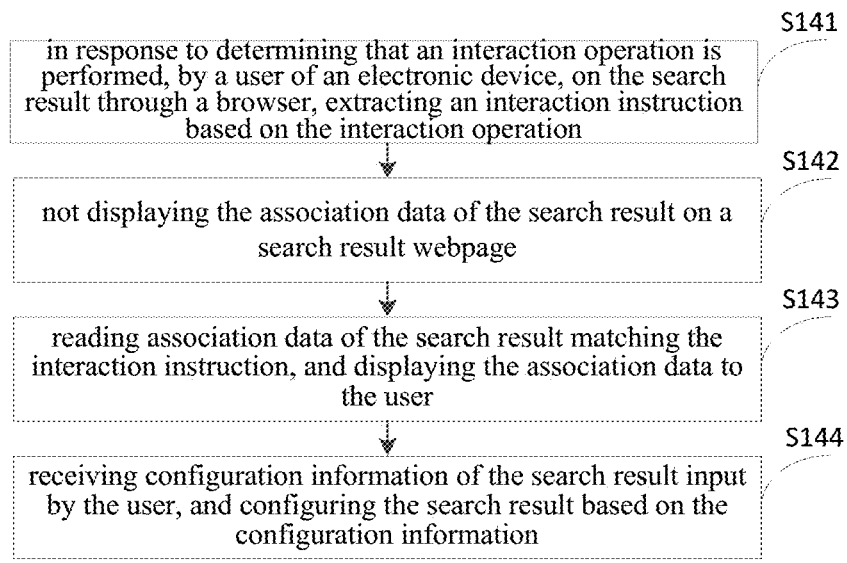
FIG. 14 is a flow chart illustrating an interaction method for a search result provided in another embodiment of the present disclosure.

FIG. 14 is a flow chart illustrating an interaction method for a search result provided in another embodiment of the present disclosure. The embodiment takes that the interaction method for the search result is configured in an interaction device for the search result as an example to illustrate.

At block S141, in response to determining that an interaction operation is performed, by a user of an electronic device, on the search result through a browser, an interaction instruction is extracted based on the interaction operation.

For example, the interaction operation may be locating the search result, moving in the space of the search result, touching, swiping, and zooming the search result, and the like, which is not limited herein.

As an example, as illustrated in FIG. 7, FIG. 7 illustrates a sliding direction icon 71. When the user touches the sliding direction icon 71 in the rich media search result, 360° view of car model may be achieved, obtaining an immersive live experience.

As an example, as illustrated in FIG. 8, FIG. 8 illustrates a zooming icon 81. When the user touches the zooming icon 81 in the rich media search result, the user may carefully view the technology and materials that the user cares about and may obtain comprehensive information on a customer product service.

At block S142, the association data of the search result is not displayed on a search result webpage.

For example, as illustrated in FIG. 9, FIG. 9 illustrates a search box 91 and a search result 92. When the user inputs a query "Mercedes Benz glc" at the search box 91 of the search engine, the search result webpage displays the search result 92 of "Mercedes Benz glc" accordingly, and at this time, only displaying data related to a model of Mercedes Benz glc. When the user does not perform any operation, the association data of the search result is not displayed in the search result webpage.

At block S143, the association data of the search result matching the interaction instruction is read, and the association data is displayed to the user.

As an example, as illustrated in FIG. 9, FIG. 9 illustrates a search box 91 and a search result 92. When the user inputs a query "Mercedes Benz glc" at the search box 91 of the search engine, the search result webpage displays the search result 92 of "Mercedes Benz glc" accordingly, and at this time, only displaying data related to a model of Mercedes Benz glc. As illustrated in FIG. 10, FIG. 10 illustrates lacquer process 101 and interior 102 of Mercedes-Benz glc. When the user clicks the interiors 102 of Mercedes-Benz glc, as illustrated in FIG. 11, a leather steering wheel 111 and a superclear electronic screen 112 are illustrated, the browser displays the data associated such as the leather steering wheel 111, the superclear electronic screen 112 and the like to the user accordingly.

As an example, as illustrated in FIG. 12, FIG. 12 illustrates a search box 121, a search result 122, a kitchen direction icon 123, and a bedroom direction icon 124. When the user inputs a query "decoration" at the search box 121 of the search engine, the search result webpage displays the search result 122 of "decoration" accordingly, and at this time, only displaying decoration data related to a living room. When touching the bedroom direction icon 124 in FIG. 12, as illustrated in FIG. 13 illustrating a living direction icon 131, the user may view the decoration data of the bedroom. Certainly, the user may further touch the living direction icon 131 in FIG. 13 to return to the living room illustrated in FIG. 12, which is not limited herein.

At block S144, configuration information of the search result input by the user is received, and the search result is configured based on the configuration information.

Alternatively, the browser of the electronic device may receive the configuration information of the search result input by the user, and configure the search result based on the configuration information, which may enable the user to obtain personalized search information, and improve the using experience of the user effectively.

Figure 15:
FIG. 15 is a schematic diagram illustrating a user implementing diversity interaction with a search result through a browsing and clicking interaction way according to embodiments of the present disclosure.

As an example, as illustrated in FIG. 15, FIG. 15 illustrates a dragging direction icon 141, a tea table 152 and a bench 153. When considering that the decoration of the living room lacks certain furniture, the user may configure the rich media search result based on his/her demands. For example, when there is no bench 153 around the tea table 152 in the living room, the user may browse various types of benches 153 on the right side of search result webpage of the rich media, click on the bench the user likes, and drag it to the tea table.

In some embodiments, the association data of the rich media search result matching the interaction instruction is displayed to the user, thus achieving diversity interaction between the user and the rich media search result, and effectively improve the immersive and scene-based experience of the user. The configuration information of the search result input by the user is received, and the search result is configured based on the configuration information, such that the user may obtain personalized search information, effectively improving the using experience of the user.

Figure 16:
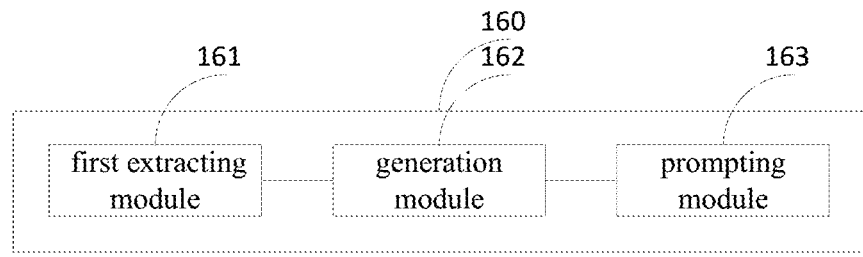
FIG. 16 is a block diagram illustrating an interaction device for a search result provided in an embodiment of the present disclosure.

FIG. 16 is a block diagram illustrating an interaction device for a search result provided in an embodiment of the present disclosure. The interaction device 160 for the search result may include: a first extracting module 161, a generation module 162 and a prompting module 163.

The first extracting module 161 is configured to extract an interaction instruction based on interaction operation in response to determining that an interaction operation is performed, by a user of an electronic device, on the search result through a browser.

The generation module 162 is configured to generate a guiding interaction step matching with the interaction instruction based on a preset rule.

The prompting module 163 is configured to promote the user based on the guiding interaction step, such that the user performs interaction with the search result based on the guiding interaction step.

Figure 17:
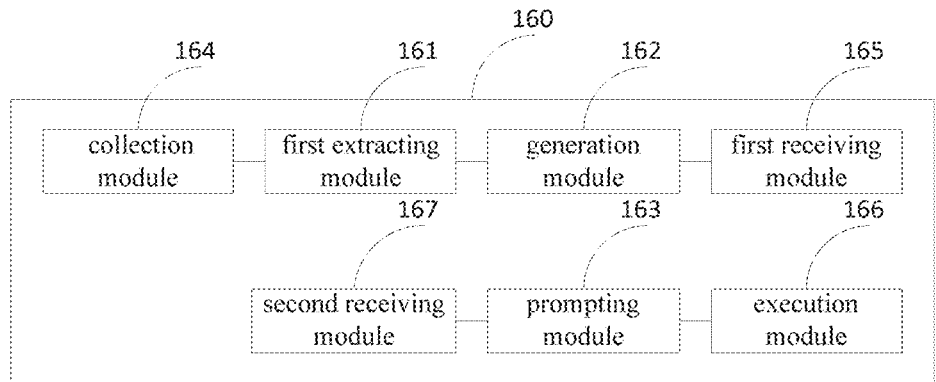
FIG. 17 is a block diagram illustrating an interaction device for a search result provided in another embodiment of the present disclosure.

In some embodiments, as illustrated in FIG. 17, the interaction device 160 for the search result may further include: a collection module 164, a first receiving module 165, an execution module 166 and a second receiving module 167.

Alternatively, the first extracting module 161 is further configured to determine that the interaction operation is performed, by the user, on the search result through the browser in response to detecting that a preset icon of the search result is triggered by the user of the electronic device through the browser.

Alternatively, the preset icon includes: a first icon configured to start a camera of the electronic device and a second icon configured to start a microphone of the electronic device.

The collection module 164 is configured to collect image data of the user through the camera and display the image data in a search result webpage when the interaction instruction includes an instruction triggering the first icon. The collection module 164 is configured to collect speech data of the user through the microphone when the interaction instruction includes an instruction triggering the second icon.

The first receiving module 165 is configured to receive an instruction triggering the guiding interaction step input in the search result webpage by the user.

The execution module 166 is configured to execute the guiding interaction step according to the instruction triggering the guiding interaction step, such that the user interacts with the search result based on the guiding interaction step.

The second receiving module 167 is configured to receive configuration information of the search result input by the user, and configure the search result based on the configuration information.

It should be noted that, the description of the interaction method for the search result according to above embodiments illustrated in FIG. 1-FIG. 5 is also applicable to the interaction device 160 for the search result, and the principle is similar, which is not elaborated herein.

In some embodiments, the user is prompted based on the guiding interaction step, so as to enable the user to interact with the rich media search result based on the guiding interaction step, thus achieving diversity interaction between the user and the rich media search result, and effectively improving the immersive and scene-based experience of the user.

Figure 18:
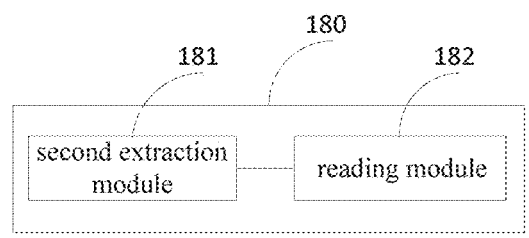
FIG. 18 is a block diagram illustrating an interaction device for a search result provided in another embodiment of the present disclosure.

FIG. 18 is a block diagram illustrating an interaction device for a search result provided in another embodiment of the present disclosure. The interaction device 180 for the search result may include: a second extraction module 181 and a reading module 182.

The second extraction module 181 is configured to extract an interaction instruction based on interaction operation in response to determining that an interaction operation is performed, by a user of an electronic device, on the search result through a browser, The reading module 182 is configured to read association data of the search result matching the interaction instruction, and display the association data to the user.

Figure 19:
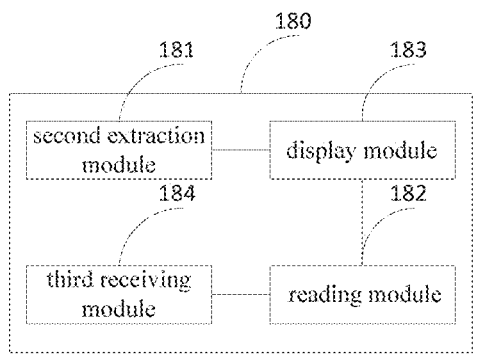
FIG. 19 is a block diagram illustrating an interaction device for a search result provided in another embodiment of the present disclosure.

In some embodiments, as illustrated in FIG. 19, the interaction device 180 for the search result may further include: a display module 183 and a third receiving module 184.

The display module 183 is configured to not display the association data of the search result on a search result webpage before reading the association data of the search result matching the interaction instruction.

The third receiving module 184 is configured to receive configuration information of the search result input by the user, and configure the search result based on the configuration information.

It should be noted that, the description of the interaction method for the search result according to above embodiments illustrated in FIG. 6-FIG. 15 is also applicable to the interaction device 180 for the search result, and the principle is similar, which is not elaborated herein.

In some embodiments, the association data of the rich media search result matching with the interaction instruction is displayed to the user, thus achieving diversity interaction between the user and the rich media search result, and effectively improving the immersive and scene-based experience of the user.

Those ordinary skilled in the art may understand that all of or part of processes of implementing the above method embodiment may be completed by computer programs to instruct relevant hardware. The programs may be stored in a computer readable storage medium, and the programs may include any of the processes in above method embodiments when being executed. The storage medium may be a magnetic disk, an optical disk, a Read-Only Memory (ROM), a Random Access Memory (RAM) and the like.

The embodiments described above are only detailed implementation of the present disclosure, however, the protection scope of the present disclosure is not limited thereto. Any changes or substitutions that can be easily thought of by those are skilled in the art within the scope of the present disclosure are within the protection scope of the present disclosure. Therefore, the protection scope of the present disclosure shall be subject to the protection scope of the claims.

What is claimed is:

1. An interaction method for a search result, wherein the search result is a rich media search result, the method comprising
   in response to determining that an interaction operation is performed, by a user of an electronic device, on the search result through a browser, extracting an interaction instruction based on the interaction operation;
   generating a guiding interaction step matching with the interaction instruction based on a preset rule; and
   prompting the user based on the guiding interaction step, such that the user performs interaction with the search result based on the guiding interaction step;
   wherein determining that the interaction operation is performed by the user of the electronic device on the search result through the browser comprises
   determining that the interaction operation is performed, by the user, on the search result through the browser in response to detecting that a preset icon of the search result is triggered by the user of the electronic device through the browser;
   wherein the preset icon comprises at least one of a first icon configured to start a camera of the electronic device and a second icon configured to start a microphone of the electronic device, and the method further comprises at least one of:
   in response to the interaction instruction comprising an instruction triggering the first icon, collecting image data of the user through the camera, and displaying the image data in a search result webpage; and
   collecting speech data of the user through the microphone in response to the interaction instruction comprising an instruction triggering the second icon.

2. The method according to claim 1, further comprising
   receiving an instruction triggering the guiding interaction step input in the search result webpage by the user;
   executing the guiding interaction step according to the instruction triggering the guiding interaction step, such that the user interacts with the search result based on the guiding interaction step.

3. The method according to claim 1, further comprising
   receiving configuration information of the search result input by the user, and configuring the search result based on the configuration information.

4. An interaction device for a search result, wherein, the search result is a rich media search result, the device comprises
   one or more processors,
   a memory storing one or more software modules executable by the one or more processors, wherein the one or more software modules comprises
   a first extracting module, configured to, in response to determining that an interaction operation is performed, by a user of an electronic device, on the search result through a browser, extract an interaction instruction based on interaction operation;
   a generation module, configured to generate a guiding interaction step matching with the interaction instruction based on a preset rule; and
   a prompting module, configured to promote the user based on the guiding interaction step, such that the user performs interaction with the search result based on the guiding interaction step;
   wherein the first extracting module is further configured to: determine that the interaction operation is performed, by the user, on the search result through the browser in response to detecting that a preset icon of the search result is triggered by the user of the electronic device through the browser;
   wherein the preset icon comprises at least one of a first icon configured to start a camera of the electronic device and a second icon configured to start a microphone of the electronic device, and the one or more software modules further comprises
   a collection module, configured to, in response to the interaction instruction including an instruction triggering the first icon, collect image data of the user through the camera, and display the image data in a search result webpage, and collect speech data of the user through the microphone in response to the interaction instruction comprising an instruction triggering the second icon.

5. The device according to claim 4, wherein the one or more software modules further comprises
   a first receiving module, configured to receive an instruction triggering the guiding interaction step input in the search result webpage by the user;
   an execution module, configured to execute the guiding interaction step according to the instruction triggering the guiding interaction step, such that the user interacts with the search result based on the guiding interaction step.

6. The device according to claim 4, wherein the one or more software modules further comprises
   a second receiving module, configured to receive configuration information of the search result input by the user, and to configure the search result based on the configuration information.

7. A non-transitory computer readable storage medium, having stored therein instructions that, when executed by a processor of a device, causes the device to perform an interaction method for a search result, the method comprising
   in response to determining that an interaction operation is performed, by a user of an electronic device, on the search result through a browser, extracting an interaction instruction based on the interaction operation;
   generating a guiding interaction step matching with the interaction instruction based on a preset rule; and prompting the user based on the guiding interaction step, such that the user performs interaction with the search result based on the guiding interaction step;

wherein determining that the interaction operation is performed by the user of the electronic device on the search result through the browser comprises determining that the interaction operation is performed, by the user, on the search result through the browser in response to detecting that a preset icon of the search result is triggered by the user of the electronic device through the browser;

wherein the preset icon comprises at least one of a first icon configured to start a camera of the electronic device and a second icon configured to start a microphone of the electronic device, and the method further comprises at least one of:

in response to the interaction instruction comprising an instruction triggering the first icon, collecting image data of the user through the camera, and displaying the image data in a search result webpage; and collecting speech data of the user through the microphone in response to the interaction instruction comprising an instruction triggering the second icon.

8. The storage medium according to claim 7, wherein the method further comprises receiving an instruction triggering the guiding interaction step input in the search result webpage by the user;

executing the guiding interaction step according to the instruction triggering the guiding interaction step, such that the user interacts with the search result based on the guiding interaction step.

9. The storage medium according to claim 7, wherein the method further comprises receiving configuration information of the search result input by the user, and configuring the search result based on the configuration information.

* * * * *